United States Patent
Lee et al.

(10) Patent No.: US 11,706,828 B2
(45) Date of Patent: Jul. 18, 2023

(54) METHOD AND APPARATUS FOR SUPPORTING TERMINAL RELAY

(71) Applicant: ELECTRONICS AND TELECOMMUNICATIONS RESEARCH INSTITUTE, Daejeon (KR)

(72) Inventors: Nam Suk Lee, Daejeon (KR); Hee Sang Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 173 days.

(21) Appl. No.: 17/382,914

(22) Filed: Jul. 22, 2021

(65) Prior Publication Data

US 2022/0086930 A1 Mar. 17, 2022

(30) Foreign Application Priority Data

Sep. 15, 2020 (KR) .................. 10-2020-0118227
May 11, 2021 (KR) .................. 10-2021-0060873

(51) Int. Cl.
*H04W 76/14* (2018.01)
*H04W 40/24* (2009.01)
*H04W 88/04* (2009.01)
*H04W 72/20* (2023.01)

(52) U.S. Cl.
CPC ........... *H04W 76/14* (2018.02); *H04W 40/24* (2013.01); *H04W 72/20* (2023.01); *H04W 88/04* (2013.01)

(58) Field of Classification Search
CPC ........ H04B 7/15; H04W 8/005; H04W 16/26; H04W 40/24–32; H04W 72/20; H04W 72/23–232; H04W 72/25; H04W 72/27; H04W 72/29; H04W 76/10–12; H04W 76/14; H04W 76/15–19; H04W 84/047; H04W 84/18; H04W 88/04
See application file for complete search history.

(56) References Cited

U.S. PATENT DOCUMENTS

| | | | |
|---|---|---|---|
| 9,019,841 B2 | 4/2015 | Tavildar et al. | |
| 10,477,608 B2 * | 11/2019 | Tenny | H04W 76/16 |
| 10,966,259 B2 | 3/2021 | Lee et al. | |
| 2008/0130575 A1 | 6/2008 | Jun et al. | |
| 2010/0087216 A1 | 4/2010 | Ko et al. | |
| 2018/0027429 A1 | 1/2018 | Li et al. | |

(Continued)

FOREIGN PATENT DOCUMENTS

| KR | 1020170129917 A | 11/2017 |
|---|---|---|
| KR | 1020180050071 A | 5/2018 |

(Continued)

OTHER PUBLICATIONS

Hong, WO/2019/160282 machine-generated English Translation, Clarivate, pp. 1-35 (Year: 2023).*

*Primary Examiner* — Thomas R Cairns
(74) *Attorney, Agent, or Firm* — Rabin & Berdo, P.C.

(57) ABSTRACT

An operation method of a first terminal in a communication system may comprise: receiving a link establishment request message from a second terminal; transmitting, to the second terminal, a link establishment response message including a node address of a first base station in response to the link establishment request message; and receiving a link establishment completion message from the second terminal.

13 Claims, 16 Drawing Sheets

(56) References Cited

U.S. PATENT DOCUMENTS

| | | |
|---|---|---|
| 2019/0288908 A1 | 9/2019 | Lee et al. |
| 2019/0357280 A1 | 11/2019 | Lee et al. |
| 2020/0091608 A1 | 3/2020 | Alpman et al. |
| 2021/0014768 A1 | 1/2021 | Hong |

FOREIGN PATENT DOCUMENTS

| | | | | |
|---|---|---|---|---|
| KR | 1020190103468 A | 9/2019 | | |
| WO | 2016186388 A1 | 11/2016 | | |
| WO | WO-2019160282 A1 * | 8/2019 | ............ | H04W 40/22 |
| WO | 2019194737 A1 | 10/2019 | | |

* cited by examiner

METHOD AND APPARATUS FOR SUPPORTING TERMINAL RELAY

CROSS-REFERENCE TO RELATED APPLICATIONS

This application claims priority to Korean Patent Applications No. 10-2020-0118227 filed on Sep. 15, 2020 and No. 10-2021-0060873 filed on May 11, 2021 with the Korean Intellectual Property Office (KIPO), the entire contents of which are hereby incorporated by reference.

BACKGROUND

1. Technical Field

The present disclosure relates to a technique for supporting a terminal relay (i.e., user equipment (UE) relay), and more specifically, to a technique for supporting a terminal relay enabling a communication service to be continued through a relay when communication between a terminal and a base station is disconnected.

2. Related Art

A millimeter wave-based mobile communication system may provide a broadband service using beamforming. In such the millimeter wave-based mobile communication system, a terminal may frequently experience communication service blockage due to obstacles such as trees, traffic signs, and vehicles due to millimeter wave frequency characteristics. In such the case, if an adjacent terminal performs a role of a relay, service continuity can be guaranteed to a terminal whose communication service is disconnected.

In this regard, there may be an integrated access and backhaul (IAB) technology and a sidelink technology as related technologies in the current 3rd generation partnership project (3GPP). The IAB technology may overcome limitations of wired connections between a control unit (CU) and digital units (DUs) in the cloud radio access network (C-RAN) structure comprising the CU, DUs, and remote units (RUs). In addition, the IAB technology may support a wireless connection between CU and DU or between DUs by installing DUs in a remote or hard-to-wired place. Here, a DU may be responsible for one cell area, and a connection between the CU and a last DU may be supported through wireless backhaul link connections of intermediate DUs existing between the CU and the last DU. Meanwhile, the sidelink technology may support Device-to-Device (D2D) communication or Vehicle-to-Everything (V2X) communication. Such the sidelink technology is a technology for directly transmitting and receiving data between terminals, and may not have a purpose of transferring data to a base station.

SUMMARY

Accordingly, exemplary embodiments of the present disclosure are directed to providing a method and an apparatus for supporting a terminal relay that guarantees service continuity for a terminal by using a relay function of an adjacent terminal.

According to a first exemplary embodiment of the present disclosure, an operation method of a first terminal in a communication system may comprise: receiving a link establishment request message from a second terminal; transmitting, to the second terminal, a link establishment response message including a node address of a first base station in response to the link establishment request message; and receiving a link establishment completion message from the second terminal.

The operation method may further comprise: receiving, from the second terminal, a routing information registration request message including routing information composed of a first root node address, a first branch node address, and a first relay adaptation protocol (RAP) entity identifier (ID), the first root node address being a node address of a second base station to which the second terminal was previously connected, and the first branch node address being a node address of the first base station; registering the routing information in a routing table, and transmitting the routing information registration request message to the first base station; receiving a routing registration confirmation message from the first base station; and transmitting the routing registration confirmation message to the second terminal.

The operation method may further comprise: receiving, from the first base station, relay data including relay routing information including a second root node address and a second RAP entity ID; searching the routing table based on the relay routing information; and in response to determining that the first root node address matches the second root node address as a result of searching the routing table, and the first RAP entity ID matches the second RAP entity ID, transmitting the relay data to the second terminal.

According to a second exemplary embodiment of the present disclosure, an operation method of a first base station in a communication system may comprise: transmitting a node address to a first terminal when the first terminal is connected to the first base station; receiving, from the first terminal, a routing information registration request message including routing information of a second terminal, the routing information being composed of a first root node address, a first branch node address, a first relay channel identifier (ID), and a first radio link control (RLC) channel ID, the first root node address being a node address of a second base station to which the second terminal was previously connected, and the first branch node address being a node address of the first base station; and registering the routing information of the second terminal in a routing table, and transmitting a routing registration confirmation message to the first terminal.

The operation method may further comprise: receiving, from the first terminal, relay data including relay routing information composed of the first root node address, the first branch node address, and the first relay channel ID; determining whether the first root node address matches the first branch node address; and in response to determining that the first root node address matches the first branch node address, processing the relay data by a packet data convergence protocol (PDCP) entity associated with the first relay channel ID.

The operation method may further comprise: in response to determining that the first root node address does not match the first branch node address, determining to transmit the relay data to the second base station based on the first root node address; and transmitting the relay data to the second base station.

The transmitting of the relay data to the second base station may comprise: connecting a first inter-node relay adaptation protocol (RAP) entity of the first base to a second inter-node RAP entity of the second base station; and transmitting, by the first inter-node RAP entity of the first base station, the relay data to the second inter-node RAP entity of the second base station.

The operation method may further comprise: receiving, from the second base station, relay data including relay routing information composed of the first root node address, the first branch node address, and the first relay channel ID; determining whether the first root node address matches the first branch node address; and in response to determining that the first root node address matches the first branch node address, transmitting the relay data to the first terminal.

The transmitting of the relay data to the first terminal may comprise: identifying the first RLC channel ID corresponding to the first relay channel ID of the relay routing information by referring to the routing table; and transmitting, by an RLC entity corresponding to the first RLC channel ID, the relay data to the first terminal.

According to a third exemplary embodiment of the present disclosure, a first base station may comprise a processor, a memory electronically communicating with the processor, and instructions stored in the memory. In addition, when executed by the processor, the instructions may cause the first base station to: transmit a node address to a first terminal when the first terminal is connected to the first base station; receive, from the first terminal, a routing information registration request message including routing information of a second terminal, the routing information being composed of a first root node address, a first branch node address, a first relay channel identifier (ID), and a first radio link control (RLC) channel ID, the first root node address being a node address of a second base station to which the second terminal was previously connected, and the first branch node address being a node address of the first base station; and register the routing information of the second terminal in a routing table, and transmit a routing registration confirmation message to the first terminal.

The instructions may further cause the first base station to: receive, from the first terminal, relay data including relay routing information composed of the first root node address, the first branch node address, and the first relay channel ID; determine whether the first root node address matches the first branch node address; and in response to determining that the first root node address matches the first branch node address, process the relay data by a packet data convergence protocol (PDCP) entity associated with the first relay channel ID.

The instructions may further cause the first base station to: in response to determining that the first root node address does not match the first branch node address, determine to transmit the relay data to the second base station based on the first root node address; and transmit the relay data to the second base station.

The instructions may further cause the first base station to: receive, from the second base station, relay data including relay routing information composed of the first root node address, the first branch node address, and the first relay channel ID; determine whether the first root node address matches the first branch node address; and in response to determining that the first root node address matches the first branch node address, transmit the relay data to the first terminal.

In the transmitting of the relay data to the second base station, the instructions may further cause the first base station to: identify the first RLC channel ID corresponding to the first relay channel ID of the relay routing information by referring to the routing table; and transmit, by an RLC entity corresponding to the first RLC channel ID, the relay data to the first terminal.

According to the exemplary embodiments of the present disclosure, when a terminal enters a communication discon-nected state in which data cannot be transmitted and received to and from a base station due to an obstacle or the like, the terminal may perform data transmission and reception with the base station by using a relay function of an adjacent terminal. In addition, according to the exemplary embodiments of the present disclosure, when a terminal is unable to transmit and receive data to and from a base station outside a cell boundary area, the terminal may perform data transmission and reception with the base station by using a relay function of an adjacent terminal. In addition, according to the exemplary embodiments of the present disclosure, when a relay terminal exists in a cell different from that of a remote terminal, a communication service can be continued through relay transmission of base stations. In addition, according to the exemplary embodiments of the present disclosure, when a remote terminal whose communication with a base station is disconnected cannot transmit and receive data through a normal Uu access link, data transmission and reception can be continued through data relaying using a relay adaptation protocol (RAP) entity located between a packet data convergence protocol (PDCP) entity and a radio link control (RLC) entity.

DETAILED DESCRIPTION OF THE EMBODIMENTS

Figure 1:
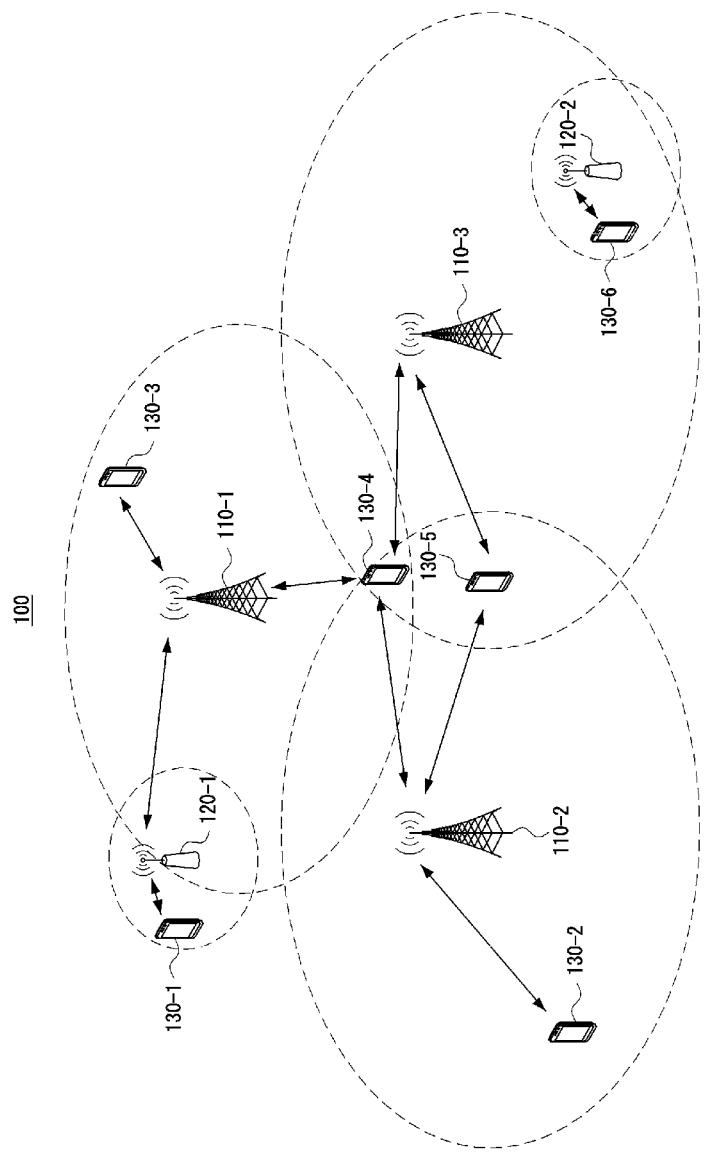
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support at least one communication protocol. For example, each of the plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
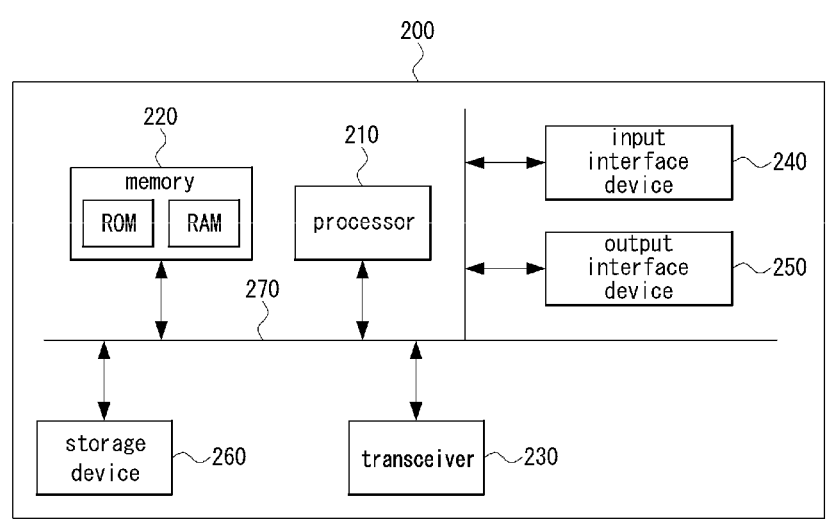
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each of the components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner. Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, a millimeter wave-based mobile communication system may provide a broadband service using beamforming. In such the millimeter wave-based mobile communication system, a terminal may frequently experience communication service blockage due to obstacles such as trees, traffic signs, and vehicles due to millimeter wave frequency characteristics. In such the case, if an adjacent terminal performs a role of a relay, service continuity may be guaranteed to the terminal whose communication service is disconnected.

Figure 3:
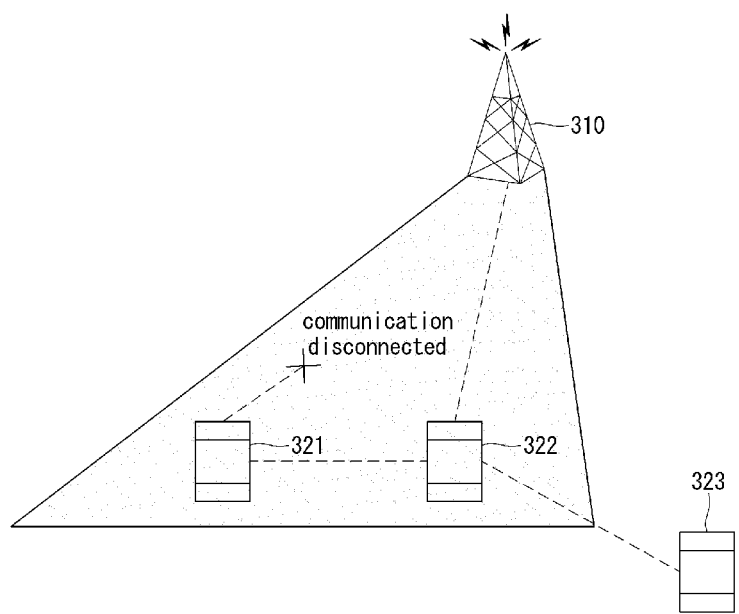
FIG. 3 is a conceptual diagram illustrating a first exemplary embodiment of a terminal relay support system.

FIG. 3 is a conceptual diagram illustrating a first exemplary embodiment of a terminal relay support system.

Referring to FIG. 3, a terminal relay support system may include a base station 310, a first terminal 321, a second terminal 322, and a third terminal 323. The first terminal 321 and the second terminal 322 may be located in a communication service coverage of the base station 310, and the third terminal 323 may be located out of the communication service coverage of the base station 310. Here, the third terminal 323 may have moved out of the communication service coverage of the base station 310 due to a movement of a user who possesses the third terminal 323. As such, when the third terminal 323 is located out of the communication service coverage of the base station 310, the third terminal 323 may access the base station 310 via the second terminal 322 to perform data transmission and reception with the base station 310. In this case, the second terminal 322 may relay communication between the base station 310 and the third terminal 323. On the other hand, since the first terminal 321 is located in the communication service coverage of the base station 310, the first terminal 321 may directly access the base station 310 to transmit and receive data to and from the base station 310. In this case, the first terminal 321 may enter a communication disconnected (e.g., blockage) state in which data cannot be transmitted/received to and from the base station 310 due to an obstacle or the like. In this case, the first terminal 321 may access the base station 310 via the second terminal 322 to transmit and receive data to and from the base station 310. Accordingly, the second terminal 322 may relay communication between the base station 310 and the first terminal 321. When a communication disconnected state occurs in which data cannot be directly transmitted/received to and from the base station 310 due to an obstacle or the like as in the case of the first terminal 321, the terminal relay support system may use the adjacent second terminal 322 as a relay so that the third terminal 321 continues to perform data transmission and reception with the first base station 310. In addition, when a terminal is unable to transmit and receive data to and from the base station 310 outside the cell coverage as in the case of the third terminal 323, the terminal relay support system may use the adjacent second terminal 322 as a relay so that the third terminal 323 continues to perform data transmission and reception with the first base station 310.

Figure 4:
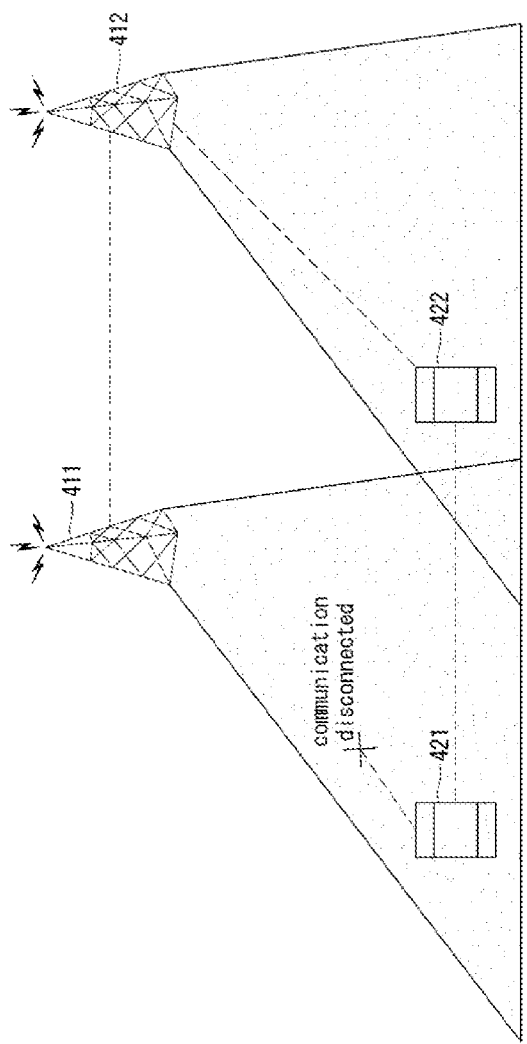
FIG. 4 is a conceptual diagram illustrating a second exemplary embodiment of a terminal relay support system.

FIG. 4 is a conceptual diagram illustrating a second exemplary embodiment of a terminal relay support system.

Referring to FIG. 4, a terminal relay support system may include a first base station 411, a second base station 412, a first terminal 421, and a second terminal 422. The first terminal 421 may be located in a communication service coverage of the first base station 412, and the second terminal 422 may be located in a communication service coverage of the second base station 412. As such, since the first terminal 421 is located in the communication service coverage of the first base station 411, the first terminal 421 may directly access the first base station 411 to transmit and receive data to and from the first base station 411. In addition, since the second terminal 422 is located in the communication service coverage of the second base station 412, the second terminal 422 may directly access the second base station 412 to transmit and receive data to and from the second base station 412. From such the state, the first terminal 421 may enter a communication disconnected state in which data cannot be transmitted and received to and from the first base station 411 due to an obstacle or the like. In this case, the first terminal 421 may access the first base station 411 via the second terminal 422 and the second base station 412 to transmit and receive data to and from the first base station 411. In this case, the second terminal 422 may relay communication between the second base station 412 and the first terminal 421. In addition, the second base station 412 may relay communication between the first base station 411 and the second terminal 422. As such, even when the second terminal 422 adjacent to the first terminal 421 is located out of the communication service coverage of the first base station 411 providing a communication service to the first terminal 421, the terminal relay support system may enable continuous data transmission/reception between the first base station 411 and the first terminal 421 via the second base station 412 providing a communication service to the second terminal 422.

Figure 5:
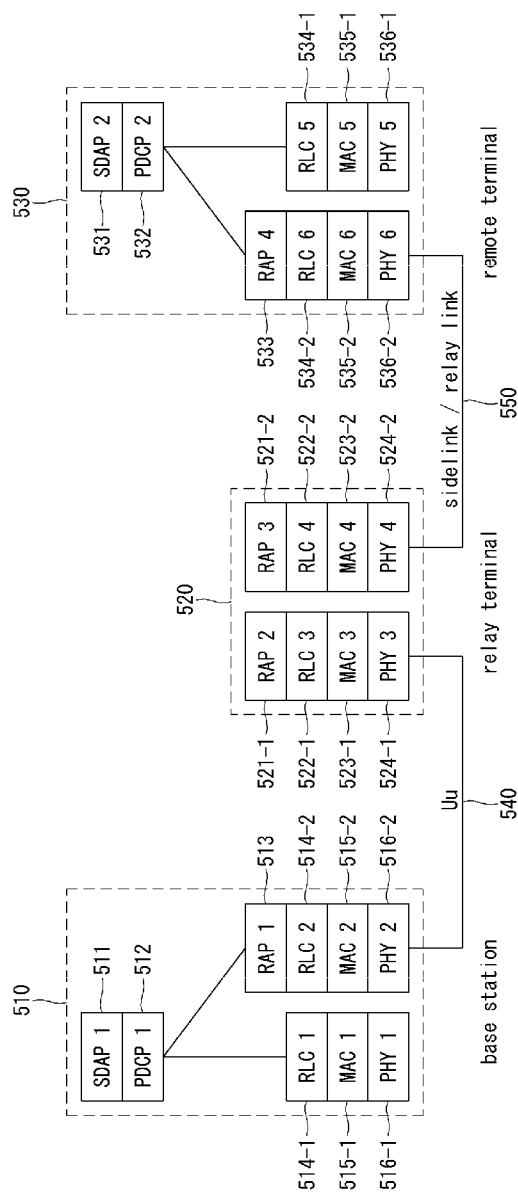
FIG. 5 is a diagram of a protocol stack structure of a terminal relay support system according to a first exemplary embodiment.

FIG. 5 is a diagram of a protocol stack structure of a terminal relay support system according to a first exemplary embodiment.

Referring to FIG. 5, a protocol stack structure of the terminal relay support system may include a protocol stack structure of a base station 510, a protocol stack structure of a relay terminal 520, and a protocol stack structure of a remote terminal 530.

Here, the protocol stack structure of the base station 510 may include a first service data adaptation protocol (SDAP) layer 511, a first packet data convergence protocol (PDCP) layer 512, a first relay adaptation protocol (RAP) layer 513, a first radio link control (RLC) layer 514-1, a second RLC layer 514-2, a first medium access control (MAC) layer 515-1, a second MAC layer 515-2, a first physical (PHY) layer 516-1, and a second PHY layer 516-2. In the protocol stack structure of the base station 510, the first SDAP layer 511, the first PDCP layer 512, the first RLC layer 514-1, the first MAC layer 515-1, and the first PHY layer 516-1 may directly support transmission and reception of data through a Uu access link of a Uu interface before the remote terminal 530 enters a communication disconnected state. In addition, when the remote terminal 530 enters a communication disconnected state, the first SDAP layer 511, the first PDCP layer 512, the first RAP layer 513, the second RLC layer 514-2, the second MAC layer 515-2 and the second PHY layer 516-2 in the protocol stack structure of the base station 510 may support communication through a Uu access link 540 of a Uu interface with the relay terminal 520, thereby transmitting and receiving data to and from the remote terminal 530 via the relay terminal 520.

Meanwhile, the protocol stack structure of the relay terminal 520 may include a second RAP layer 521-1, a third RAP layer 521-2, a third RLC layer 522-1, a fourth RLC layer 522-2, a third MAC layer 523-1, a fourth MAC layer 523-2, a third PHY layer 524-1, and a fourth PHY layer 524-2. In the protocol stack structure of the relay terminal 520, the second RAP layer 521-1, the third RLC layer 522-1, the third MAC layer 523-1, and the first PHY layer 524-1 may support communication with the base station 510 through the Uu access link 540. In contrast, in the protocol stack structure of the relay terminal 520, the third RAP layer 521-2, the fourth RLC layer 522-2, the fourth MAC layer 523-2, and the fourth PHY layer 524-2 may support communication with the remote terminal 530 through a sidelink or a relay link 550.

In addition, the protocol stack structure of the remote terminal 530 may include a second SDAP layer 531, a second PDCP layer 532, a fourth RAP layer 533, a fifth RLC layer 534-1, a sixth RLC layer 534-2, a fifth MAC layer 535-1, a sixth MAC layer 535-2, a fifth PHY layer 536-1, and a sixth PHY layer 536-2. In the protocol stack structure of the remote terminal 530, the second SDAP layer 531, the second PDCP layer 532, the fifth RLC layer 534-1, the fifth MAC layer 535-1, and the fifth PHY layer 536-1 may directly support data transmission and reception with the base station 510 through a Uu access link before the remote terminal enters a communication disconnected state. In contrast, in the protocol stack structure of the remote terminal 530, the second SDAP layer 531, the second PDCP layer 532, the fourth RAP layer 533, the sixth RLC layer 534-2, the sixth MAC The layer 535-2, and the sixth PHY layer 536-2 may support communication with the relay terminal 520 through the sidelink or a relay link 550 when the remote terminal 530 enters a communication disconnected state.

As described above, in the terminal relay support system, the first RAP layer 513 may be added in the protocol stack structure of the base station 510 as a lower layer of the first PDCP layer 512 so that the base station 510 communicates with the relay terminal 520 to transmit and receive data to and from the remote terminal 530, and the second RLC layer 514-2, the second MAC layer 515-2, the second PHY layer 516-2 may be provided to support the added first RAP layer 513. In addition, in the terminal relay support system, the second RAP layer 521-1 may be added in the protocol stack structure of the relay terminal 520 so that the relay terminal 520 communicates with the base station 510 to transmit and receive data to and from the base station 510, and the third RLC layer 522-1, the third MAC layer 523-1, and the third PHY layer 524-1 may be provided to support the added second RAP layer 521-1.

In addition to these, in the terminal relay support system, the third RAP layer 521-2 may be added in the protocol stack structure of the relay terminal 520 so that the relay terminal 520 communicates with the remote terminal 530 to transmit and receive data to and from the remote terminal 530, and the fourth RLC layer 522-2, the fourth MAC layer 523-2, and the fourth PHY layer 524-2 may be provided to support the added third RAP layer 521-2. Further, in the terminal relay support system, the fourth RAP layer 533 may be added in the protocol stack structure of the remote terminal 530 as a lower layer of the second PDCP layer 532 so that the remote terminal 530 can communicate with the relay terminal 520 to transmit and receive data to and from the relay terminal 520, and the sixth RLC layer 534-2, the sixth MAC layer 535-2, and the sixth PHY layer 536 may be provided to support the added fourth RAP layer 533. As described above, in order to support the relay function, the first RAP layer 513 and the fourth RAP layer 533 may be located between the PDCP layers 512 and 532 and the RLC layers 514-1, 514-2, 534-1, and 534-2 according to the general protocol stack structure including the SDAP layers 511 and 531, PDCP layers 512 and 532, RLC layers 514-1, 514-2, 534-1, and 534-2, and MAC layer 515-1, 515-2, 535-1, and 535-2.

As described above, the terminal relay support system may use a plurality of RAP layers 513, 521-1, 521-2, and 533 to provide relay to the base station 510 through the relay terminal 520 adjacent to the remote terminal 530. The base station 510 and the remote terminal 530 may perform data transmission and reception with the relay terminal 520 through data relaying using the first and fourth RAP layers 513 and 533 when normal data transmission and reception is impossible through a Uu access link. Then, data transmission/reception between the base station 510 and the remote terminal 530 may be relayed using the second RAP layer 521-1 and the third RAP layer 521-2 of the relay terminal 520. To this end, the plurality of RAP layers 513, 521-1, 521-2, and 533 may perform functions of registering, changing, and releasing routing information for data transmission and reception between the base station 510 and the remote terminal 530.

In such the situation, when the remote terminal 530 enters a communication disconnected state and direct data communication with the base station 510 using a Uu access link is impossible, the remote terminal 530 may perform data communication with the base station 510 through the relay terminal 520 capable of communicating with the base station 510 using the Uu access link 540.

Figure 6:
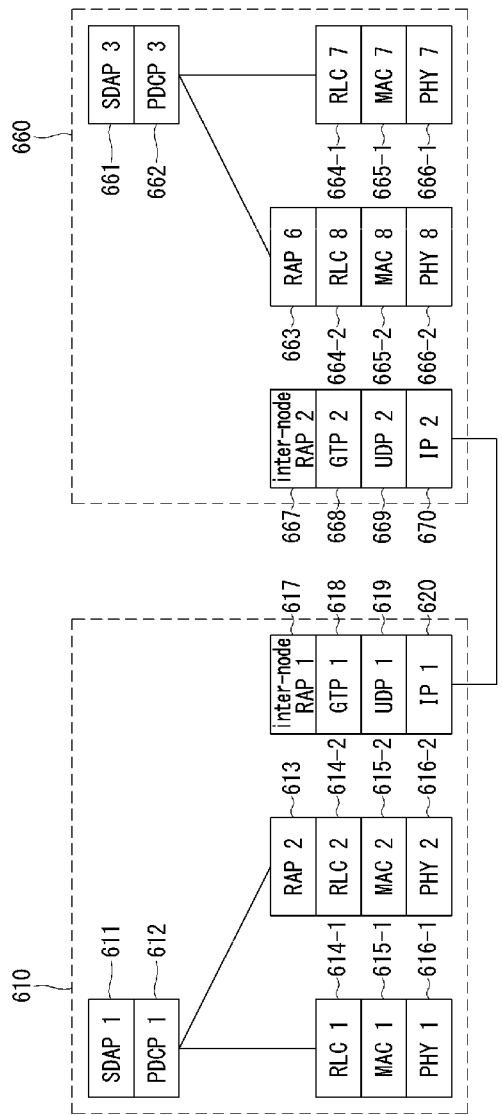
FIG. 6 is a diagram illustrating a protocol stack structure of a base station according to a first exemplary embodiment.

FIG. 6 is a diagram illustrating a protocol stack structure of a base station according to a first exemplary embodiment.

Referring to FIG. 6, a base station protocol stack structure may include a protocol stack structure of a branch base station 610 and a protocol stack structure of a root base station 660. Here, the protocol stack structure of the branch base station 610 may include a first SDAP layer 611, a first PDCP layer 612, a first RAP layer 613, a first RLC layer 614-1, a second RLC layer 614-2, a first MAC layer 615-1, a second MAC layer 615-2, a first PHY layer 616-1, a second PHY layer 616-2, a first inter-node RAP layer 617, a first general packet radio service (GPRS) tunneling protocol (GTP) layer 618, a first user datagram protocol (UDP) layer 619, and a first Internet protocol (IP) layer 620. In the protocol stack structure of the branch base station 610 described above, the first RAP layer 613 and the first inter-node RAP layer 617 may be connected.

In addition, the protocol stack structure of the root base station 660 may include a third SDAP layer 661, a third PDCP layer 662, a sixth RAP layer 663, a seventh RLC layer 664-1, an eighth RLC layer 664-2, a seventh MAC layer 665-1, an eighth MAC layer 665-2, a seventh PHY layer 666-1, an eighth PHY layer 666-2, a second inter-node RAP layer 667, a second GTP layer 668, a second UDP layer 669, and a second IP layer 670. In the protocol stack structure of the root base station 660 described above, the sixth RAP layer 663 and the second inter-node RAP layer 667 may be connected.

Here, the branch base station 610 may be connected to the relay terminal, receive data transmitted by the remote terminal, and transmit the received data to the root base station 660. In addition, the branch base station 610 may receive data transmitted from the root base station 660 to the remote terminal as a destination, and transmit the data to the relay terminal, so that the data is delivered to the remote terminal.

In addition, the root base station 660 may be directly connected to the remote terminal to transmit and receive data to and from the remote terminal before the remote terminal enters a communication disconnected state. However, when the remote terminal enters a communication disconnected state, the root base station 660 may access the branch base station 610 to receive data transmitted by the remote terminal via the relay terminal. Then, when the remote terminal enters a communication disconnected state, the root base station 660 may access the branch base station 610, and transmit data destined for the remote terminal to the branch base station 610, so that the branch base station 610 delivers the data to the remote terminal via the relay terminal.

In order to perform such the function, in the protocol stack structure of the branch base station 610, the first SDAP layer 611, the first PDCP layer 612, the first RAP layer 613, the second RLC layer 614-2, the second MAC layer 615-2, and the second PHY layer 616-2 may support communication with the relay terminal through a Uu access link of a Uu interface to perform data transmission and reception with the remote terminal via the relay terminal. In addition, the first RAP layer 613 of the branch base station 610 may receive data transmitted from the relay terminal to the root base station as a destination, and deliver the data to the first inter-node RAP layer 617. Then, the first inter-node RAP layer 617 may deliver the data received from the first RAP layer 613 to the second inter-node RAP layer 667 of the root base station 660. Conversely, the first inter-node RAP layer 617 may receive the data destined for the remote terminal from the second inter-node RAP layer 667 of the root base station 660, and deliver the data to the first RAP layer 613. Then, the first RAP layer 613 may transmit the received data to the relay terminal, thereby delivering the data to the remote terminal.

Meanwhile, the third SDAP layer 661, the third PDCP layer 662, the seventh RLC layer 664-1, the seventh MAC layer 665-1, and the seventh PHY layer 666-1 of the root base station 660 may transmit and receive data to and from the remote terminal by directly accessing the remote terminal using a Uu access link before the remote terminal enters a communication disconnected state. In addition, the first RAP layer 663 of the root base station 660 may deliver data destined for the remote terminal to the second inter-node RAP layer 667. Then, the second inter-node RAP layer 667 may deliver the data received from the second RAP layer 663 to the first inter-node RAP layer 617 of the branch base station 610 to deliver the data to the remote terminal via the relay terminal. On the contrary, the second inter-node RAP layer 667 may receive data destined for the root base station 660 from the first inter-node RAP layer 617 of the branch base station 610, and deliver the data to the second RAP layer 663. Then, the second RAP layer 663 may deliver the received data to the third PDCP layer 662 so that data reception is completed.

Figure 7:
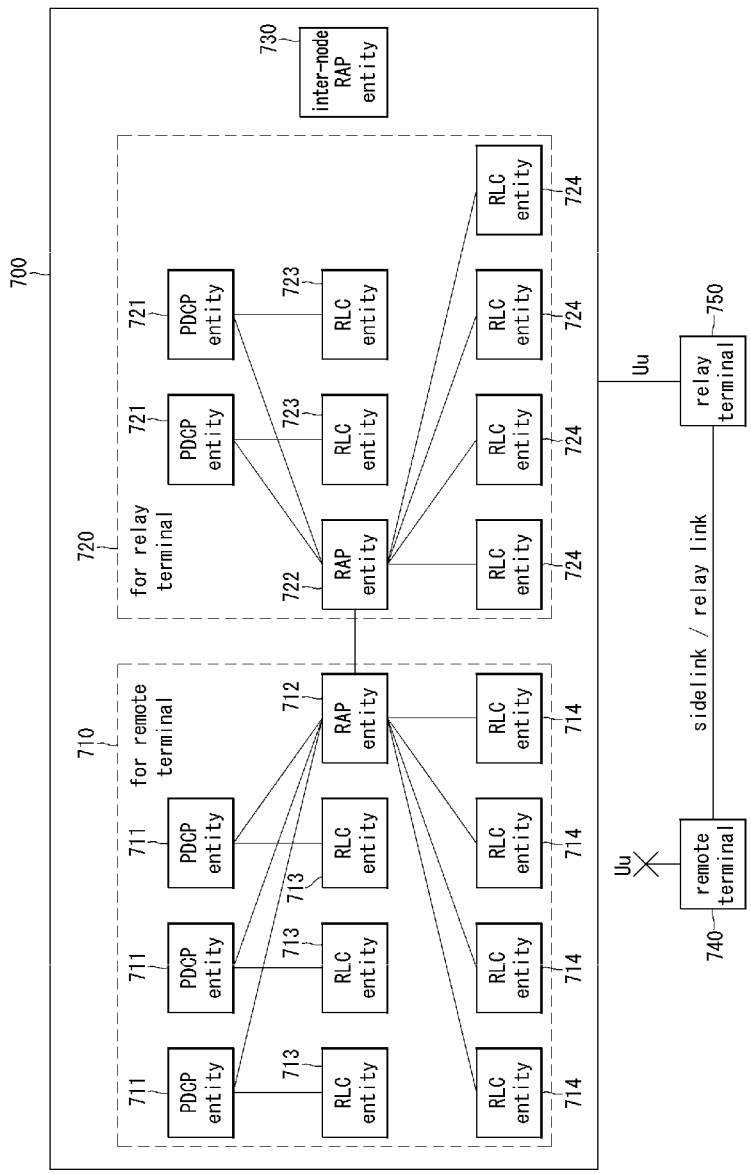
FIG. 7 is a diagram illustrating a structure of entities of a terminal relay support system according to a first exemplary embodiment.

FIG. 7 is a diagram illustrating a structure of entities of a terminal relay support system according to a first exemplary embodiment.

Referring to FIG. 7, a structure of entities of the terminal relay support system may include an entity structure 710 for remote terminal, an entity structure 720 for relay terminal, and an intern-node RAP entity 730 in a base station 700. Here, a remote terminal 740 may also support a relay function. Here, the entity structure 710 for remote terminal in the base station 700 may include a plurality of remote terminal (rUE) PDCP entities 711, a rUE RAP entity 712, a plurality of rUE RLC entities 713 not associated with the RAP entity 712, and a plurality of rUE RLC entities 714 associated with the RAP entity 712. In addition, the entity structure 720 for relay terminal in the base station 700 may include a plurality of relay terminal (RUE) PDCP entities 721, a RUE RAP entity 722, a plurality of RUE RLC entities 724 not associated with the RAP entity 722, and a plurality of RUE RLC entities 723 associated with the RAP entity 722.

As described above, the base station 700 may configure the RAP entities 712 and 722 when initial connection establishment with the terminals 740 and 750 is completed. That is, the base station 700 may configure the RAP entities 712 and 722 for the respective terminals 740 and 750 when the initial connection establishment with all the terminals 740 and 750 supporting the relay function is completed. In this case, the base station 700 may control the terminals 740 and 750 so that the terminals 740 and 750 may configure the RAP entities and the RLC entities associated with the RAP entities. Then, when the remote terminal 740 enters a communication disconnected state and a relay connection is established using the relay terminal 750, the base station may connect the RAP entity 712 and the RAP entity 722 to perform relay data transmission and reception.

Figure 8:
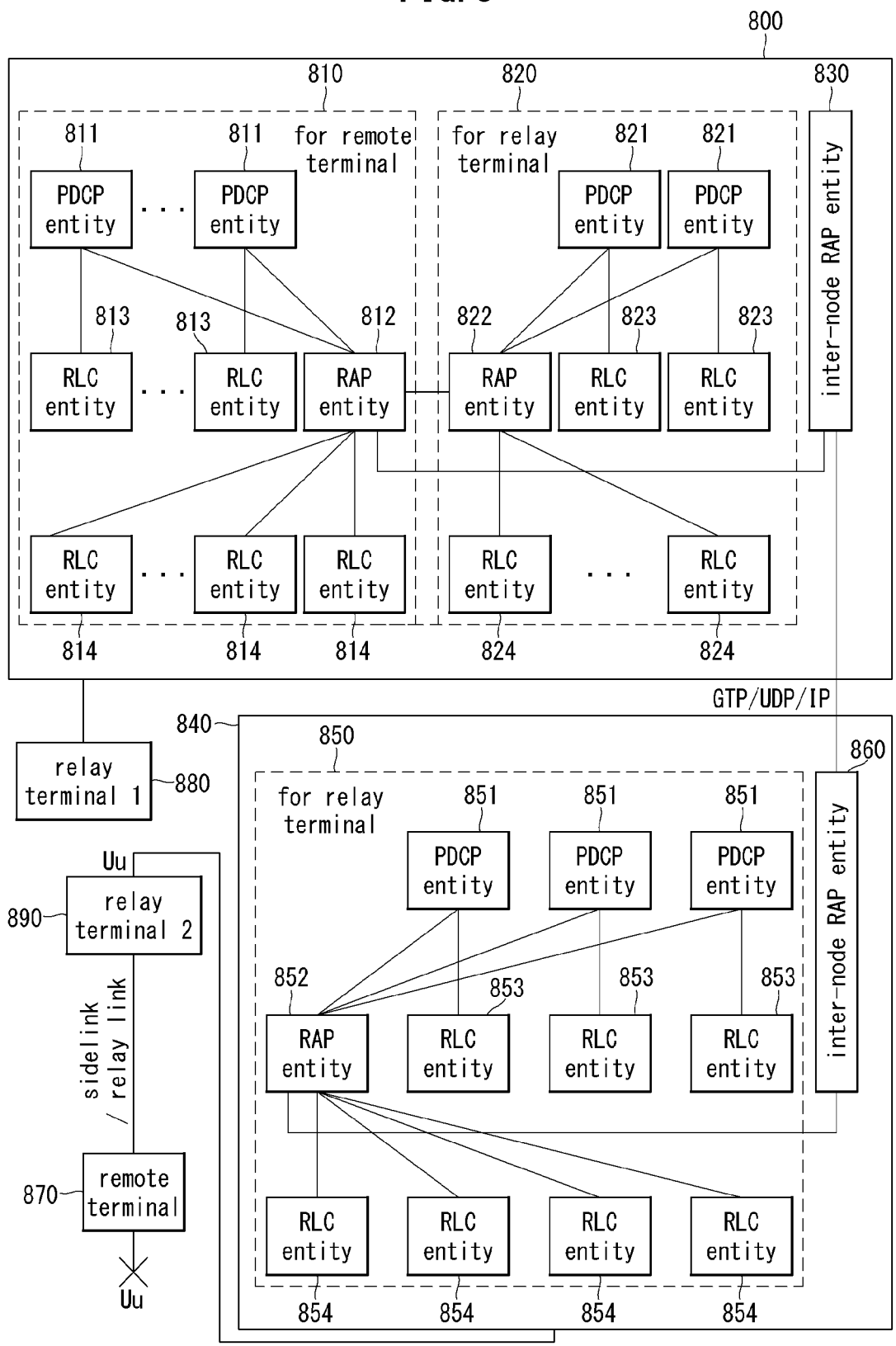
FIG. 8 is a diagram illustrating a structure of entities of a terminal relay support system according to a second exemplary embodiment.

FIG. 8 is a diagram illustrating a structure of entities of a terminal relay support system according to a second exemplary embodiment.

Referring to FIG. 8, a structure of entities of the terminal relay support system may include an entity structure 810 for a remote terminal of a root base station 800, an entity structure 820 for a first relay terminal 880 located in a communication service coverage of the root base station 800, a root inter-node RAP entity 830 of the root base station 800, an entity structure 850 for a second relay terminal 890 located in a communication service coverage of a branch base station 840, and a branch inter-node RAP entity 860 of a branch base station 840.

Here, the entity structure 810 for a remote terminal 870 of the root base station 800 may include a plurality of rUE PDCP entities 811, a rUE RAP entity 812, a plurality of rUE RLC entities 813 not associated with the RAP entity 812, and a plurality of rUE RLC entities 813 associated with RAP entity 812. In addition, the entity structure 820 for the first relay terminal 880 of the root base station 800 may include a plurality of RUE PDCP entities 821 for the first relay terminal 880, a RAP entity 822 for the second relay terminal 890, a plurality of RUE RLC entities 823 for the second relay terminal 890, which are not associated with the RAP entity 822, and a plurality of RUE RLC entities 824 for the second relay terminal 890, which are associated with RAP entity 822. In addition, the entity structure 850 for the second relay terminal 890 of the branch base station 840 may include a plurality of RUE PDCP entities 851 for the second relay terminal 890, a RAP entity 852 for the relay terminal, a plurality of RUE RLC entities 853 f not associated with the RAP entity 852, and a plurality of RUE RLC entities 854 associated with the RAP entity 852.

As described above, the root base station 800 may configure the RAP entities 812 and 822 when the initial connection establishment with the terminals 870 and 880 is completed. That is, the root base station 800 may configure the RAP entities 812 and 822 for the respective terminals when all the terminals 870 and 880 supporting the relay function complete the initial connection establishment. In this case, the root base station 800 may control the terminals 870 and 880 so that the terminals 870 and 880 may configure the RAP entities and the RLC entities associated with the RAP entities. In addition, the branch base station 840 may configure the RAP entity 852 when the initial connection establishment with the terminal 890 is completed. That is, the branch base station 840 may configure the RAP entity 852 when the terminal 890 supporting the relay function completes the initial connection establishment. In this case, the branch base station 840 may control the terminal 890 so that the terminal 890 configures the RAP entity and the RLC entities associated with the RAP entity. The branch inter-node RAP entity 860 and the root inter-node RAP entity 830 may be initially connected to support inter-terminal relay.

In such the situation, when the remote terminal 870 enters a communication disconnected state with the root base station 800 and a relay connection is established using the second relay terminal 890, the branch base station 840 may perform relay data transmission and reception by connecting (the RAP entity 852 for the second relay terminal and the branch inter-node RAP entity 860) to (the root inter-node RAP entity 830 and the RAP entity 812 for the remote terminal). That is, when the remote terminal 870 enters a communication disconnected state with the root base station 800 and a relay connection is established using the second relay terminal 890, the branch base station 840 may perform relay data transmission and reception by connecting the branch inter-node RAP entity 860 to the root inter-node RAP entity 830.

Figure 9:
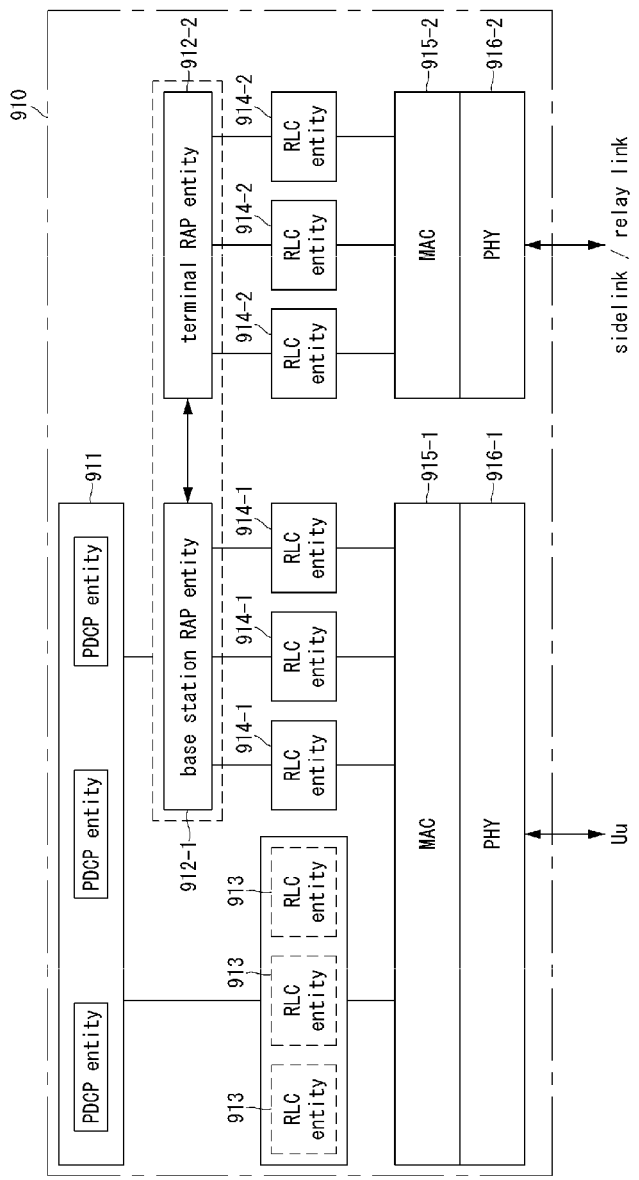
FIG. 9 is a diagram illustrating a structure of entities of a relay terminal according to a first exemplary embodiment.

FIG. 9 is a diagram illustrating a structure of entities of a relay terminal according to a first exemplary embodiment.

Referring to FIG. 9, a structure of entities of a relay terminal 910 may include a plurality of PDCP entities 911, a base station RAP entity 912-1, a terminal RAP entity 912-2, a plurality of base station RLC entities 913 not associated with the RAP entities 912-1 and 912-2, a plurality of base station RLC entities 914-1 associated with the RAP entity 912-1, a base station MAC layer 915-1, a base station PHY layer 916-1, a plurality of terminal RLC entities 914-2 associated with the RAP entity 912-2, a terminal MAC layer 915-2, and a terminal PHY layer 916-2.

When the initial connection establishment with the base station is completed, a relay terminal 910 may receive RAP configuration information from the base station, and generate the base station RAP entity 912-1 for the base station. In addition, the relay terminal 910 may generate the terminal RAP entity 912-2 for a remote terminal when the remote terminal accesses and requests data relaying. In such the relay terminal 910, the terminal RAP entity 912-2 may be located between a RAP entity of the remote terminal and the base station RAP entity 912-2 to perform data relaying. In addition, the base station RAP entity 912-2 may be located between the terminal RAP entity 912-2 and the base station to perform data relaying.

Figure 10:
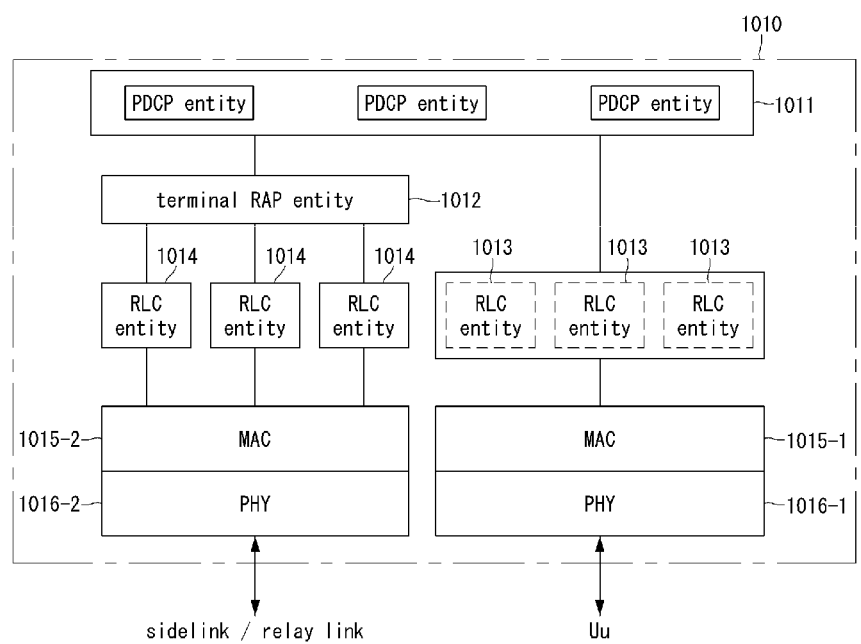
FIG. 10 is a diagram illustrating a structure of entities of a remote terminal according to a first exemplary embodiment.

FIG. 10 is a diagram illustrating a structure of entities of a remote terminal according to a first exemplary embodiment.

Referring to FIG. 10, a structure of entities of a remote terminal 1010 may include a plurality of PDCP entities 1011, a terminal RAP entity 10012, a plurality of base station RLC entities 1013 not associated with the RAP entity 1012, a plurality of terminal RLC entities 1014 associated with the RAP entity 10102, a base station MAC layer 1015-1, a terminal MAC layer 1015-2, a base station PHY layer 1016-1, and a terminal PHY layer 1016-2.

When entering a communication disconnected state, the remote terminal 1010 may select a relay terminal from among adjacent terminals to establish a sidelink or a relay link, and thus may generate the terminal RAP entity 1012. In such the remote terminal, the terminal RAP entity 1012 may be connected to the terminal RAP entity of the relay terminal to perform data transmission and reception.

Meanwhile, the RAP entities may perform routing to transmit relay data to a next node or terminal. In order for the RAP entity to perform routing, a relay-related address and identifier (ID) for data transmission may be required.

Figure 11:
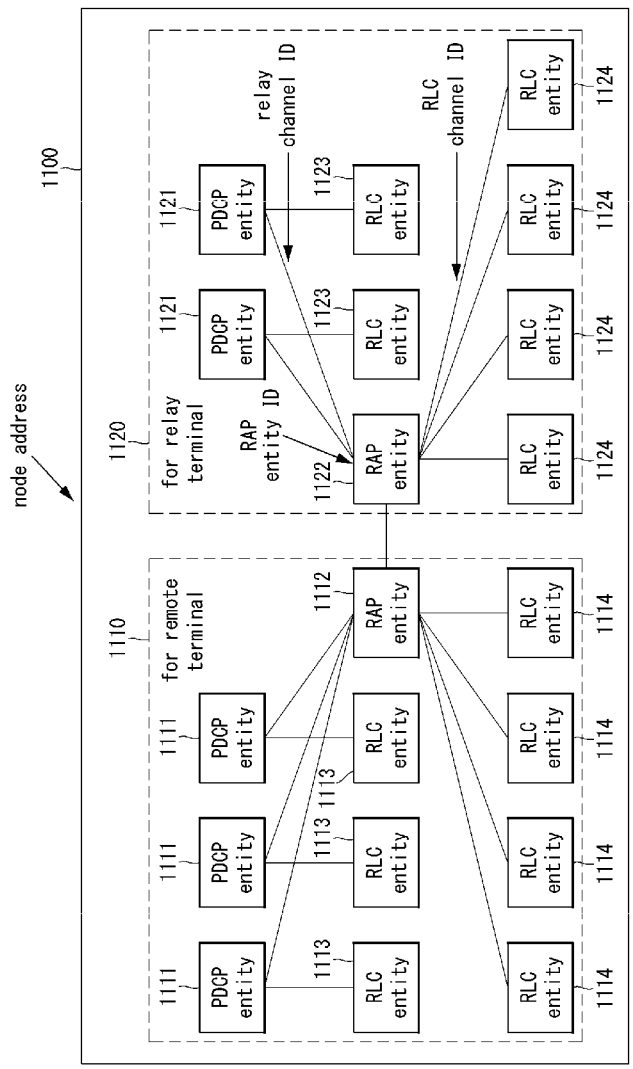
FIG. 11 is a conceptual diagram illustrating a method of assigning addresses and identifiers to a base station and entities of the base station.

FIG. 11 is a conceptual diagram illustrating a method of assigning addresses and identifiers to a base station and entities of the base station.

Referring to FIG. 11, an entity structure of a base station 1100 may include an entity structure 1010 for remote terminal and an entity structure 1020 for relay terminal. Here, the entity structure 1110 for remote terminal of the base station 1100 may include a plurality of rUE PDCP entities 1111, a rUE RAP entity 1112, a plurality of rUE RLC entities 1113 not associated with the RAP 1112, and a plurality of rUE RLC entities 11114 associated with the RAP 1112. In addition, the entity structure 1120 for relay terminal of the base station 1100 may include a plurality of RUE PDCP entities 1121, a RUE RAP entity 1122, a plurality of RUE RLC entities 1123 not associated with the RAP entity 1122, and a plurality of RUE RLC entities 1124 associated with the RAP entity 1122.

The base station 1100 may have a node address. The node address may be classified into a root node address and a branch node address according to a type of a terminal to which the base station provides a communication service. Here, a root node address may refer to an address of a base station in which an RRC and PDCP for a remote terminal are disposed to provide a communication service to the remote terminal. The remote terminal may receive a node address from the corresponding base station and configure it as a root node address. In addition, the remote terminal may transmit the root node address to a relay terminal. Meanwhile, a branch node address may refer to a node address of a base station that provides a communication service to a relay terminal supporting a Uu access link among relay terminals. The relay terminal may access the corresponding base station to receive the node address and configure it as a branch node address. In addition, the relay terminal may transmit the branch node address to the remote terminal. Accordingly, the remote terminal and the relay terminal may determine whether the root node address and the branch node address are the same. When the root node address and the branch node address are the same, the remote terminal and the relay terminal may determine that the base station to which the remote terminal was connected before a disconnection of communication is the same as the base station to which the relay terminal is connected. On the other hand, when the root node address and the branch node address are different, the remote terminal and the relay terminal may determine that the base station to which the remote terminal was connected before a disconnection of communication is different from the base station to which the relay terminal is connected.

The base station 1100 may assign a RAP entity ID to each of the RAP entities 1112 and 1122. That is, the base station 1100 may assign a rUE RAP entity ID to the rUE RAP entity 1112 for remote terminal, and may assign a RUE RAP entity ID to the RUE RAP entity 1122. As such, the base station 1100 may assign different RAP entity IDs to the rUE RAP entity 1112 and the RUE RAP entity 1122. Accordingly, the base station 1100 may identify the remote terminal using the root node address and the rUE RAP entity ID. Similarly, the base station may identify the relay terminal using the branch node address and the RUE RAP entity ID.

The base station 1100 may need to identify the RUE PDCP entity 1121 associated with a PDCP entity of the remote terminal in order to identify a PDCP entity connected to a radio bearer configured in the remote terminal. To this end, the base station 1100 may need to identify a channel between the RUE PDCP entity 1121 associated with the PDCP entity of the remote terminal and the RUE RAP entity 1122. To this end, the base station 1100 may assign a relay channel ID to the channel between the RUE PDCP entity 1121 associated with the PDCP entity of the remote terminal and the RUE RAP entity 1122. For relaying of data associated with each PDCP entity, each PDCP entity of the base station 1100 and the remote terminal may transmit information on a relay channel ID associated with each PDCP entity and relay data to the RUE PDCP entity 1121. When a destination of data received from a lower layer is itself, the RUE PDCP entity 1121 may transmit relay data to the RUE PDCP entity 1121 associated with the relay channel ID of the relay data. In order to transmit the data to a next node, the base station 1110 may assign an RLC channel ID to an RLC channel. Accordingly, the relay channel ID and the RLC channel ID may be linked one-to-one or n-to-one. The RUE PDCP entity 1121 may determine the RLC channel through which data is transmitted based on the relay channel ID.

The base station 1110 may configure the RUE PDCP entity 1121 and the RUE RLC entities 1124 when the relay terminal completes connection establishment through the Uu access link. The base station 1110 may deliver root node address information, RAP entity ID information, relay channel ID information for each PDCP entity, mapping information between relay channel ID and RLC channel ID, RLC configuration information associated with the RLC channel ID, etc. to the relay terminal through a control message, etc. The relay terminal receiving the information may configure the RAP entity and the RLC entity, and store the information on the root node address, RAP entity ID, relay channel ID, and RLC channel ID, and mapping information thereof.

On the other hand, the remote terminal may establish a sidelink or a relay link with an adjacent terminal when entering a communication disconnected state in which data transmission and reception cannot be performed through the Uu access link due to an obstacle or the like.

Figure 12:
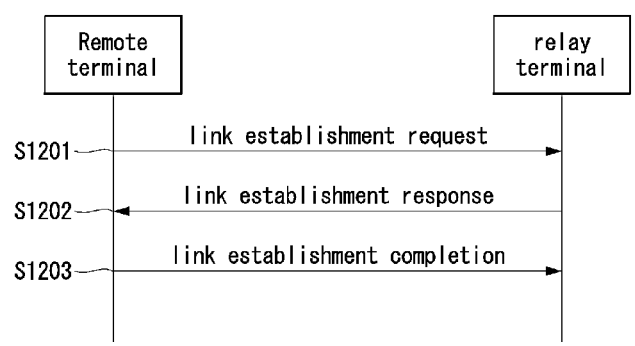
FIG. 12 is a sequence chart illustrating a first exemplary embodiment of a method for establishing a link between a remote terminal and a relay terminal.

FIG. 12 is a sequence chart illustrating a first exemplary embodiment of a method for establishing a link between a remote terminal and a relay terminal.

Referring to FIG. 12, in a method for establishing a link between a remote terminal and a relay terminal, when the remote terminal enters a communication disconnected state in which the remote terminal cannot perform data transmission and reception with a base station via a Uu access link due to an obstacle, or the like, the remote terminal may transmit a link establishment request message to the relay terminal in order to establish a sidelink or a relay link (S1201). Then, in response to the link establishment request message, the relay terminal may transmit a link establishment response message including a node address of a currently-connected base station to the remote terminal (S1202). Accordingly, the remote terminal may configure a node address included in the link establishment response message received from the relay terminal as a branch node address, and may transmit a link establishment completion message to the relay terminal (S1203).

Through this process, a RAP entity of the remote terminal may perform a procedure for configuring routing information when the establishment of the sidelink or relay link is completed. The routing information may include a transmission direction, a node address, a RAP entity ID, a relay channel ID, and the like. Here, the transmission direction may include a forward (or downlink) and a reverse (or uplink). In addition, the node address may include a root node address and the branch node address.

Figure 13:
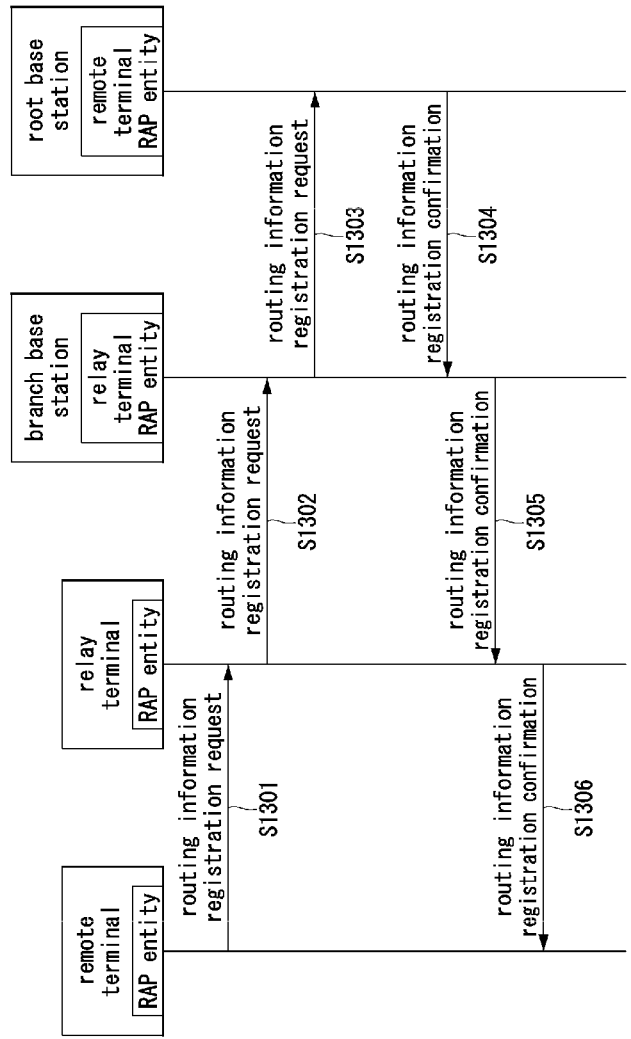
FIG. 13 is a sequence chart illustrating a first exemplary embodiment of a routing information registration method.

FIG. 13 is a sequence chart illustrating a first exemplary embodiment of a routing information registration method.

Referring to FIG. 13, in a routing information registration method, the RAP entity of the remote terminal may transmit a routing information registration request message including the routing information to the relay terminal (S1301). Accordingly, the RAP entity of the relay terminal receiving the routing information registration request message may register the routing information, and may transmit the routing information registration request message to the branch base station (S1302). Then, a RUE RAP entity in the branch base station, which corresponds to the RAP entity of the relay terminal, may register the routing information, determine the root base station to which the routing information registration request message is forwarded based on the root node address, and deliver the routing information registration request message to the corresponding root base station (S1303). The rUE RAP entity in the root base station, which corresponds to the RAP entity of the remote terminal, receiving the message may register the routing information, and transmit a routing registration confirmation message to the branch base station in response to the routing information registration request message (S1304). To this end, the root base station may determine the branch base station to which the relay node is connected by using the branch node address, and may forward the routing registration confirmation message to the corresponding branch base station. Then, the branch base station may receive the routing registration confirmation message and transmit it to the relay terminal (S1305). Accordingly, the relay terminal may receive the routing registration confirmation message and transmit it to the remote terminal (S1306).

Meanwhile, each RAP entity may include relay routing information in a protocol data unit (PDU) header of each data. Accordingly, each RAP entity may receive data having a PDU header including relay routing information, and may forward relay data to a next node based on the relay routing information included in the PDU header of the received data.

Figure 14:
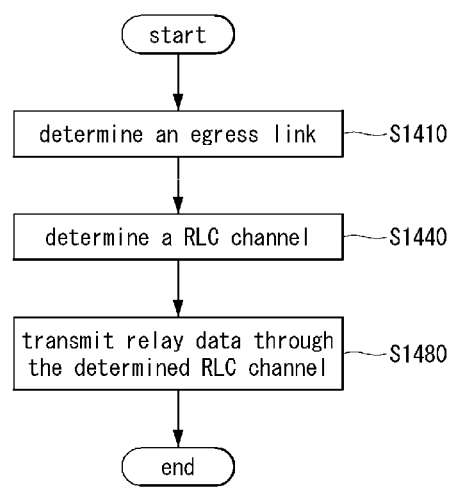
FIG. 14 is a flowchart illustrating a first exemplary embodiment of a method for supporting terminal relay.

FIG. 14 is a flowchart illustrating a first exemplary embodiment of a method for supporting terminal relay.

Referring to FIG. 14, in a method for supporting terminal relay, the RAP entity may determine an egress link to forward relay data (S1410). The RAP entity may use the transmission direction, root node address, branch node address, RAP entity ID, relay channel ID, etc. to determine the egress link.

Figure 15:
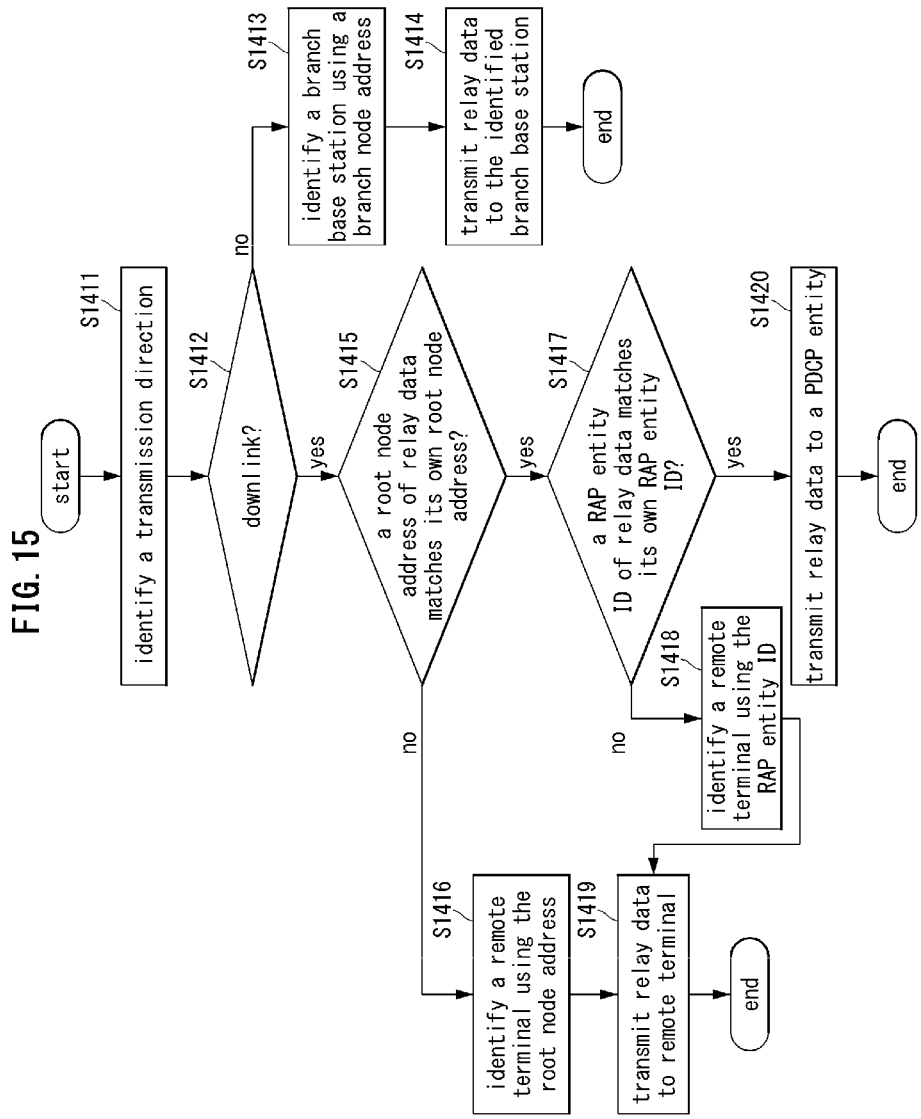
FIG. 15 is a flowchart illustrating a first exemplary embodiment of a procedure of determining an egress link in FIG. 14.

FIG. 15 is a flowchart illustrating a first exemplary embodiment of a procedure of determining an egress link in FIG. 14.

Referring to FIG. 15, in the egress link determination process, the terminal RAP entity may identify a transmission direction of relay data (S1411), and determine whether the transmission direction is downlink (S1412). If the transmission direction is not downlink, the terminal RAP entity may determine the transmission direction as uplink, identify the branch base station using the branch node address (S1413), and transmit the relay data to the corresponding branch base station (S1414).

Alternatively, if the transmission direction is downlink, the terminal RAP entity may determine whether the root node address of the relay data matches its root node address (S1415). As a result of the determination, if the root node address of the relay data does not match its root node address, the terminal RAP entity may refer to the routing table to identify the remote terminal based on the root node address (S1416), and transmit the relay data to the identified remote terminal (S1419).

On the other hand, if the root node address of the relay data matches its root node address, the terminal RAP entity may determine whether the RAP entity ID of the relay data matches its RAP entity ID (S1417). As a result of the determination, if the RAP entity ID of the relay data does not match its RAP entity ID, the terminal RAP entity may identify the remote terminal with the RAP entity ID by referring to the routing table (S1418), and transmit the relay data to the identified remote terminal (S1419). Alternatively, when the RAP entity ID of the relay data matches its RAP entity ID, the terminal RAP entity may forward the data to the PDCP entity to which the relay channel ID is matched (S1420).

Figure 16:
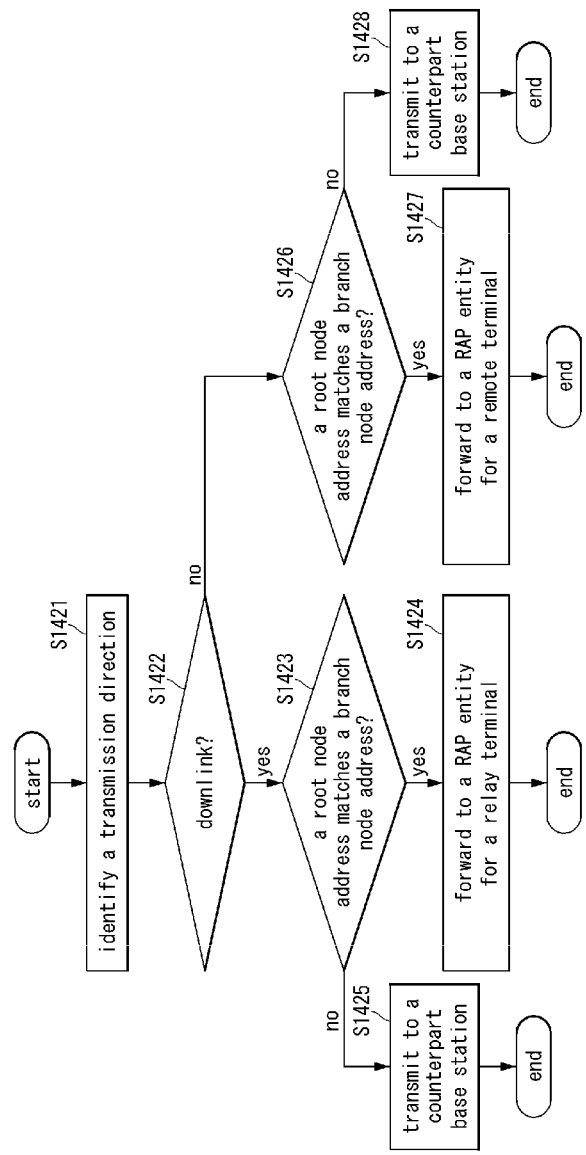
FIG. 16 is a flowchart illustrating a second exemplary embodiment of a procedure of determining an egress link in FIG. 14.

FIG. 16 is a flowchart illustrating a second exemplary embodiment of a procedure of determining an egress link in FIG. 14.

Referring to FIG. 16, in the egress link determination process, the base station RAP entity may identify the transmission direction of relay data (S1421), and may determine whether the identified transmission direction is downlink (S1422). Accordingly, if the transmission direction is downlink, the base station RAP entity may determine whether the root node address of the relay data matches the branch node address (S1423). As a result of the determination, if the root node address of the relay data matches the branch node address, the base station RAP entity may forward the data to the RAP entity for relay terminal in the base station when the remote terminal and the relay terminal are connected to the same base station (S1424). On the other hand, if the root node address of the relay node does not match the branch node address, the base station RAP entity may forward the data to the inter-node RAP entity even when the remote terminal and the relay terminal are not connected to the same base station. Then, the inter-node RAP entity may forward the relay data to the counterpart base station indicated by the branch node address based on the branch node address (S1425). Accordingly, the inter-node RAP entity of the counterpart base station may forward the data to the RAP entity associated with the relay terminal.

On the other hand, if the transmission direction of the relay data is uplink, the base station RAP entity may determine whether the root node address of the relay data matches the branch node address match (S1426). As a result of the determination, if the root node address of the relay data matches the branch node address, the base station RAP entity may forward the data to the remote terminal RAP entity in the base station when the remote terminal and the relay terminal are connected to the same base station. (S1427). On the other hand, if the root node address of the relay data does not match the branch node address, the base station RAP entity may forward the data to the inter-node RAP entity when the remote terminal and the relay terminal are not connected to the same base station. Then, the inter-node RAP entity may forward the data to the base station indicated by the root node address based on the root node address (S1428). Accordingly, the inter-node RAP entity of the counterpart base station may forward the data to the RAP entity associated with the remote terminal.

Referring again to FIG. 14, the RAP entity may identify a relay channel ID, and determine the RLC channel through which to transmit the data based on the identified relay channel ID in order to forward the relay data to the determined egress node (S1440). Then, the RAP entity may transmit the data to the corresponding entity through the determined RLC channel (S1480). Then, the RLC entity may forward the data to the corresponding MAC entity, the MAC entity may forward the data to the corresponding PHY entity, and the PHY entity may forward the data to the corresponding terminal.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first terminal in a communication system, the operation method comprising:
receiving a link establishment request message from a second terminal;
transmitting, to the second terminal, a link establishment response message including a node address of a first base station in response to the link establishment request message;
receiving a link establishment completion message from the second terminal;
receiving, from the second terminal, a routing information registration request message including routing information composed of a first root node address, a first branch node address, and a first relay adaptation protocol (RAP) entity identifier (ID), the first root node address being a node address of a second base station to which the second terminal was previously connected, and the first branch node address being a node address of the first base station;
registering the routing information in a routing table, and transmitting the routing information registration request message to the first base station;
receiving a routing registration confirmation message from the first base station; and
transmitting the routing registration confirmation message to the second terminal.

2. The operation method according to claim 1, further comprising:
receiving, from the first base station, relay data including relay routing information including a second root node address and a second RAP entity ID;
searching the routing table based on the relay routing information; and
in response to determining that the first root node address matches the second root node address as a result of searching the routing table and the first RAP entity ID matches the second RAP entity ID, transmitting the relay data to the second terminal.

3. An operation method of a first base station in a communication system, the operation method comprising:
transmitting a node address to a first terminal when the first terminal is connected to the first base station;
receiving, from the first terminal, a routing information registration request message including routing information of a second terminal, the routing information being composed of a first root node address, a first branch node address, a first relay channel identifier (ID), and a first radio link control (RLC) channel ID, the first root node address being a node address of a second base station to which the second terminal was previously connected, and the first branch node address being a node address of the first base station; and
registering the routing information of the second terminal in a routing table, and transmitting a routing registration confirmation message to the first terminal.

4. The operation method according to claim 3, further comprising:
receiving, from the first terminal, relay data including relay routing information composed of the first root node address, the first branch node address, and the first relay channel ID;
determining whether the first root node address matches the first branch node address; and
in response to determining that the first root node address matches the first branch node address, processing the relay data by a packet data convergence protocol (PDCP) entity associated with the first relay channel ID.

5. The operation method according to claim 4, further comprising:
in response to determining that the first root node address does not match the first branch node address, determining to transmit the relay data to the second base station based on the first root node address; and
transmitting the relay data to the second base station.

6. The operation method according to claim 5, wherein the transmitting of the relay data to the second base station comprises:
   connecting a first inter-node relay adaptation protocol (RAP) entity of the first base station to a second inter-node RAP entity of the second base station; and
   transmitting, by the first inter-node RAP entity of the first base station, the relay data to the second inter-node RAP entity of the second base station.

7. The operation method according to claim 3, further comprising:
   receiving, from the second base station, relay data including relay routing information composed of the first root node address, the first branch node address, and the first relay channel ID;
   determining whether the first root node address matches the first branch node address; and
   in response to determining that the first root node address matches the first branch node address, transmitting the relay data to the first terminal.

8. The operation method according to claim 7, wherein the transmitting of the relay data to the first terminal comprises:
   identifying the first RLC channel ID corresponding to the first relay channel ID of the relay routing information by referring to the routing table; and
   transmitting, by an RLC entity corresponding to the first RLC channel ID, the relay data to the first terminal.

9. A first base station, the first base station comprising a processor, a memory electronically communicating with the processor, and instructions stored in the memory, wherein when executed by the processor, the instructions cause the first base station to:
   transmit a node address to a first terminal when the first terminal is connected to the first base station;
   receive, from the first terminal, a routing information registration request message including routing information of a second terminal, the routing information being composed of a first root node address, a first branch node address, a first relay channel identifier (ID), and a first radio link control (RLC) channel ID, the first root node address being a node address of a second base station to which the second terminal was previously connected, and the first branch node address being a node address of the first base station; and
   register the routing information of the second terminal in a routing table, and transmit a routing registration confirmation message to the first terminal.

10. The first base station according to claim 9, wherein the instructions further cause the first base station to:
    receive, from the first terminal, relay data including relay routing information composed of the first root node address, the first branch node address, and the first relay channel ID;
    determine whether the first root node address matches the first branch node address; and
    in response to determining that the first root node address matches the first branch node address, process the relay data by a packet data convergence protocol (PDCP) entity associated with the first relay channel ID.

11. The first base station according to claim 10, wherein the instructions further cause the first base station to:
    in response to determining that the first root node address does not match the first branch node address, determine to transmit the relay data to the second base station based on the first root node address; and
    transmit the relay data to the second base station.

12. The first base station according to claim 9, wherein the instructions further cause the first base station to:
    receive, from the second base station, relay data including relay routing information composed of the first root node address, the first branch node address, and the first relay channel ID;
    determine whether the first root node address matches the first branch node address; and
    in response to determining that the first root node address matches the first branch node address, transmit the relay data to the first terminal.

13. The first base station according to claim 12, wherein in the transmitting of the relay data to the second base station, the instructions further cause the first base station to:
    identify the first RLC channel ID corresponding to the first relay channel ID of the relay routing information by referring to the routing table; and
    transmit, by an RLC entity corresponding to the first RLC channel ID, the relay data to the first terminal.

* * * * *